INVENTORS
ARTHUR C. LIND
WILLIAM J. KATZ

ATTORNEY

Nov. 22, 1960    A. C. LIND ET AL    2,961,099
APPARATUS FOR SEPARATION OF LIQUIDS OR
OF SOLIDS FROM A LIQUID

Filed April 14, 1958      2 Sheets-Sheet 2

*INVENTORS*
ARTHUR C. LIND
WILLIAM J. KATZ

BY

*Ernst W. Schultz*

ATTORNEY

United States Patent Office 2,961,099
Patented Nov. 22, 1960

2,961,099
APPARATUS FOR SEPARATION OF LIQUIDS OR OF SOLIDS FROM A LIQUID

Arthur C. Lind, Wauwatosa, and William J. Katz, Fox Point, Wis., assignors to Chain Belt Company, Milwaukee, Wis., a corporation of Wisconsin Filed Apr. 14, 1958, Ser. No. 728,129

8 Claims. (Cl. 210—519)

This invention relates to settling and liquid clarification tanks and particularly to distribution means providing the introduction of the raw liquid into the tank.

The efficient settling or separation of the suspended matter requires the uniform loading or equal distribution of the flow throughout the volume of the tank.

The flow should be equally distributed horizontally and vertically throughout the tank for maximum detention time of the liquid and opportunity for the suspended matter to either float to the surface of the liquid or settle to the bottom of the tank. The flow should also be distributed over the area of the tank so that the resultant distribution of the separated matter is that intended having regard to the operation of the collection means.

The proper distribution of the flow throughout the tank for maximum efficiency depends upon the introduction of the raw liquid into the tank, and requires a minimum of turbulence of the incoming raw liquid. Such turbulence represents the undistributed velocity energy of the incoming liquid and results in eddy currents which cause mixing of the clarified liquid in the tank with the partially settled or separated matter. Such currents also cause short-circuiting wherein appreciable portions of the liquid flow at high velocity directly through the tank to the outlet with no separation of the suspended matter.

The present invention is directed to means providing the introduction of the raw liquid into the tank at or about the periphery of the tank to flow inwardly towards the center of the tank.

According to the present invention, an inner skirt spaced from the outer side wall of the tank defines an annular dispersion zone having a lower open end from which the raw liquid feeds into the tank. The raw liquid is supplied to the dispersion zone by a distribution channel which extends around the rim of the tank and which is provided with a series of orifices or ports opening into the upper part of the dispersion zone. The raw liquid is distributed uniformly throughout the dispersion zone and in approaching the lower part of the dispersion zone the raw liquid moves only in a downwardly direction and with a uniform or minimum velocity throughout so that the liquid is thereupon introduced into the clarification zone with no mixing or turbulence.

The present invention provides a feed zone of considerable depth with a high velocity distribution channel which provides the equal distribution of the raw liquid around the periphery of the tank required for the maximum efficiency referred to.

The inlet channel of the present invention is sufficiently large to provide a flow which does not vary appreciably at different rates. Since the energy gradient of the flow through the channel remains of a much lower magnitude than the head loss of the flow through the ports, there is no appreciable difference in the delivery of the raw liquid from the distribution channel to the various parts of the feed zone. The channel is of diminishing cross-section so that a substantially uniform or minimum velocity is maintained throughout. By reason thereof, the necessary number of ports may be of equal size and spacing to provide the uniform introduction of the fluid into the distribution zone of the circular tank. Where the invention is employed in a rectangular tank, the spacing may be decreased toward the corners for a slightly increased flow which would correspond to the greater distance to the effluent means at the center of the tank. This would provide a uniform detention time as to the flow in each sector of the tank.

A principal object of the invention is to provide a more efficient peripheral-feed gravity separation tank suitable for sanitation and industrial waste treatment.

Another, more particular object is to provide a peripheral-feed separation tank having a stable distribution system but not having a multiplicity of small orifices which are subject to clogging.

Another object is to provide for the uniform distribution of the raw liquid to the peripheral-feed zone within a wide range of flow rates.

Another object is to provide a channel velocity sufficient to keep the channel clear of any solids settling therein and capable of carrying such material as well as scum or any floating material to the end of the channel for removal, and further to maintain such velocity without affecting the uniform distribution of the raw liquid to the feed zone.

Another object is to simplify the removal of scum from the distribution channel.

The drawings furnished herewith illustrate the best mode of carrying out the invention as presently contemplated and set forth hereinafter.

Figure 1:
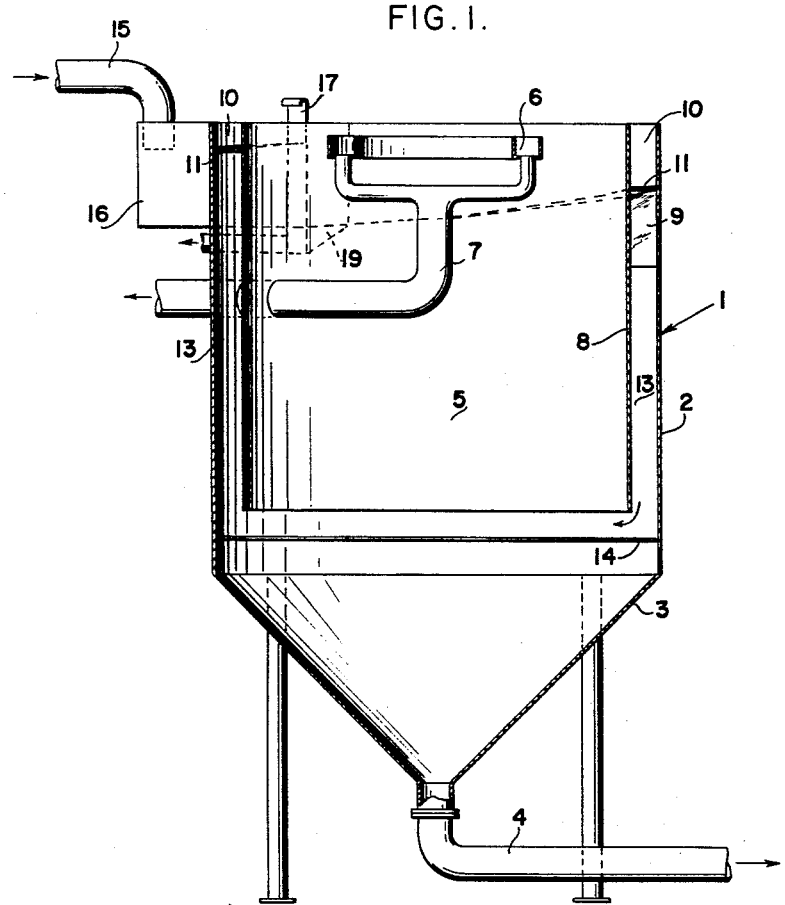
Figure 1 is a vertical, central cross-section of a circular steel tank having a circular effluent trough at the center of the tank, an annular dispersion zone extending around the periphery of the tank, and a distribution channel above and opening downwardly into dispersion zone.
Figure 2:
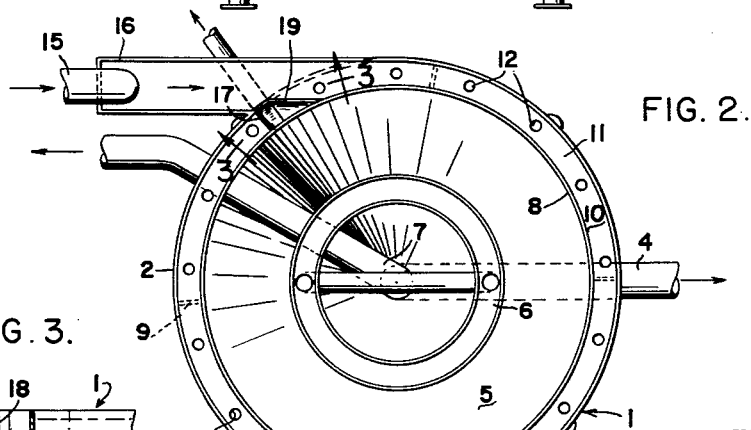
Fig. 2 is a plan view of the tank shown in Figure 1.

The tank 1 of steel construction shown in the drawings includes a vertical, cylindrical wall 2 forming the sides of the lower cone 3 forming the bottom of the tank. The pipe 4 connected to the lower, smaller end of cone 3 provides for the withdrawal of the heavier liquids or solids separation from the raw liquid in the central clarification zone 5 of the tank. The circular trough 6 centrally located at the top of clarification zone 5 is connected to pipe 7 and receives the clear effluent at the surface of the contained liquid for discharge through pipe 7 which extends through the wall 2 of the tank.

The cylindrical member 8 concentrically disposed within tank 1 is spaced from the wall 2 of the tank and is supported therein by the several vertical bracket plates 9 connecting wall 2 and member 8. The upper part of member 8 and the upper part of wall 2 of tank 1 form the sides of the circular channel 10 which extends around the tank. The floor 11 of channel 10 supported between wall 2 of tank 1 and member 8 above plates 9 is provided with the series of orifices 12 which open downwardly into the upper part of the annular dispersion zone 13 located between the lower part of member 8 and wall 2 of tank 1. The lower end of zone 13 opens into clarification zone 5 of tank 1 above the horizontal baffle 14 extending inwardly from and around wall 2 of the tank.

The pipe 15 delivering the raw liquid to the tank discharges into one end of the rectangular, open box 16. The other end of box 16 is fixed to tank 1 for support and opens into or merges with the one end of channel 10 to provide an initial straight flow which is tangential to the circular flow-path of channel 10.

The top edge of trough 6 forms an effluent weir and is disposed above floor 11 and orifices 12 so that the floor is normally submerged or below the liquid level maintained in the tank as determined by the height of trough 6 and so that the orifices are subject to a given hydraulic head which is equal to the height of the flow in the channel above the liquid level maintained in the tank. According to the invention, floor 11 is also pitched to provide the diminishing cross-section of the channel necessary to maintain a minimum and a uniform velocity of the flow around the rim of the tank.

In the operation of tank 1, the raw liquid is delivered by pipe 15 to box 16 to flow into channel 10 and through orifices 12 into dispersion zone 13. The velocity energy of the liquid passing through orifices 12 is distributed throughout the liquid in dispersion zone 13 as the individual streams from the several orifices merge in approaching the lower end of zone 13. The merged streams pass between the lower edge of member 8 and baffle 14 to enter clarification zone 5 of tank 1 with a minimum of turbulence or agitation and with no high-velocity currents.

The amount of liquid passing through each of orifices 12 is determined by the hydraulic head in channel 10 and the velocity of the liquid approaching the respective ports. Both the head and velocity referred to are maintained uniform throughout channel 10 at any given rate of flow so that by making the several orifices 12 of the same size, an almost equal distribution of the liquid into zone 13 is assured. The energy gradient of the flow in channel 10 is in the order of 0.00005 for tanks as small as 25 feet in diameter so that the head as to all the orifices may be regarded as being the same at any given rate of flow. The orifices are readily made the same size and by providing floor 11 with a suitable pitch, the cross-section of the flow in channel 10 diminishes to maintain a minimum velocity of flow in the channel to prevent settling and to carry any floating material to the end of the channel.

The end of channel 10 is normally closed by the gate 17 which is movable vertically in the guides 18 and is removable or can be lowered to open the end of channel 10 and allow the flow to extend into the well 19 located next to the open end of influent box 16.

According to the present invention, the uniform width and diminishing depth of channel 10 provides a generally uniform channel velocity, as described, which is easily sufficient to keep floor 11 scoured and to carry all material collecting on the floor into the orifices and to carry the scum to the end of the channel.

Upon opening gate 17, the scum collected ahead of the gate is carried by the flow into well 19. Gate 17 may be immediately readjusted to then reclose the end of the channel to prevent excess liquid from being included with the removed scum.

Figure 3:
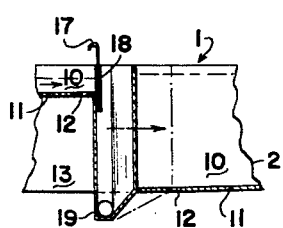
Fig. 3 is a section taken on lines 3—3 of Fig. 2.
Figure 4:
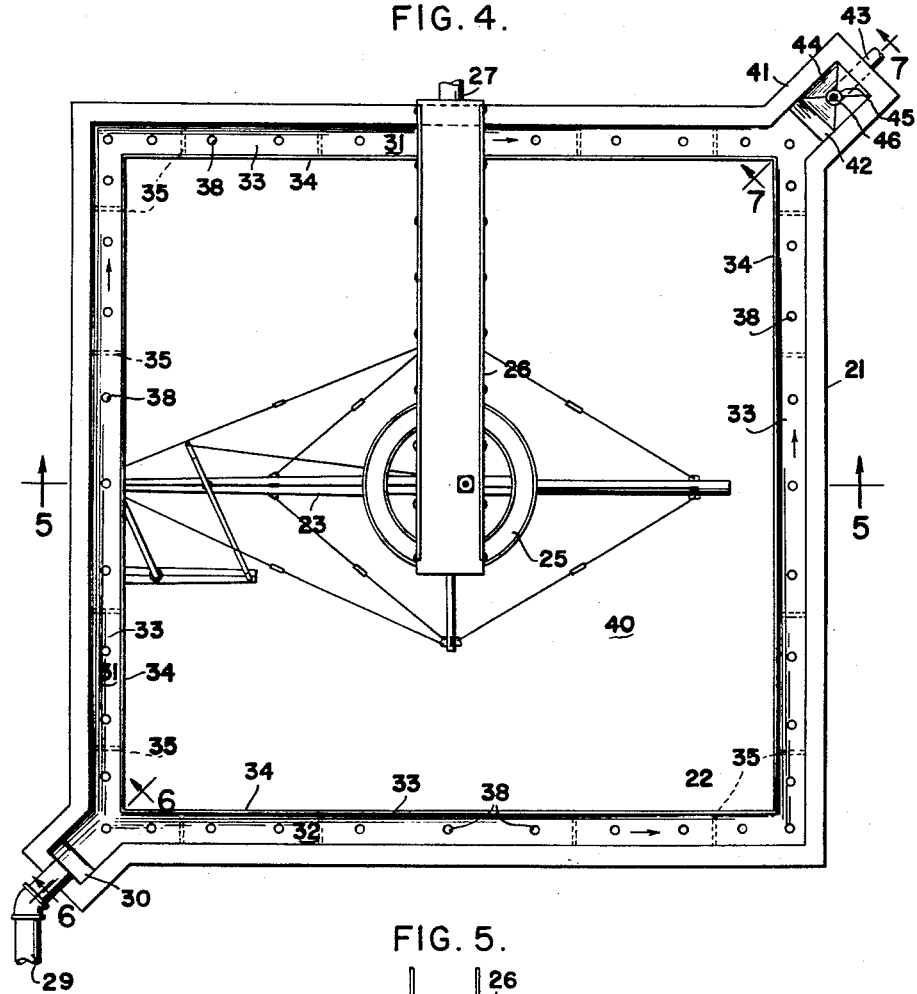
Fig. 4 is a plan view of a square tank with apparatus of the type described and claimed in U.S. Patent No. 2,863,564 entitled Extensible Header for Clarification Tank.
Figure 5:
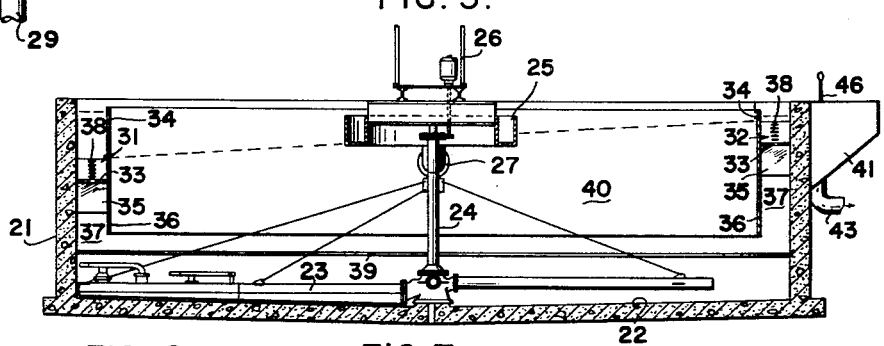
Fig. 5 is a vertical cross-section taken on line 5—5 of the tank in Fig. 4 and showing the collector means in elevation and the influent and effluent means partly in section.
Figure 6:
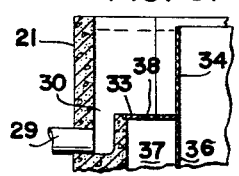
Fig. 6 is a section taken on line 6—6 of Fig. 4.
Figure 7:
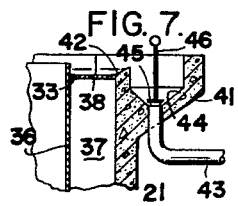
Fig. 7 is a section taken on line 7—7 of Fig. 4.

The invention is intended also for settling tanks commonly used in sewage treatment as shown in Figs. 3 and 4 wherein the tank 21 is of concrete construction and may be of a size with a periphery of up to 300 feet. The sludge settling on the flat concrete floor 22 is removed hydraulically by the extensible eduction tube 23 which is rotated by the supporting drive tube 24 and operates as described and claimed in the application of A. C. Lind, G. W. Quast and T. J. Koeske, Serial No. 601,826, filed August 2, 1956, for Extensible Arm for Clarification Tanks, now Patent No. 2,863,564.

The effluent collecting trough 25 is supported from the end of the bridge 26 at the center of the tank and discharges through the pipe 27 extending beneath the bridge and through the wall of the tank.

The pipe 29 delivering the raw liquid to tank 21 discharges into the box 30 of concrete construction at one corner of the tank. The sides of box 30 are disposed at an angle of 135° with respect to the two adjacent sides of tank 21 and the box opens into the separate channels 31 and 32 which extend around the perimeter of the tank to the opposite corner of the tank.

The bottom or floor 33 and the sides 34 of channels 31 and 32 are of steel construction and are supported at intervals by the vertical steel plates 35 projecting from the side walls of tank 21 beneath the channel. The skirts 36 are attached to the projecting plates 35 for support and to the floor 33 to form the dispersion zone 37 which is coextensive about the perimeter of the tank.

The raw liquid passing from box 30 into channels 31 and 32 flows from the channels into the dispersion zone 37 through the orifices or ports 38 in floor 33 located at intervals in two series extending to the corner of the tank opposite box 30. The shelf 39 extending around the perimeter of tank 21 and secured to the side walls of the tank is spaced a given distance from the lower edge of skirt 36 and serves to deflect the flow from dispersion zone 37 into the central clarification zone 40 of the tank without disturbing the sludge blanket on the floor 22 of the tank.

According to the invention, the floor 33 of each of channels 31 and 32 slopes upwardly from box 30 to the concrete box 41 of the tank opposite inlet box 30. The floor of box 41 and the floor 33 of each channel are disposed below the level of the liquid in the tank as determined by effluent trough 25.

The dimensions of channels 31 and 32 at inlet box 30 should be sufficient to provide the maximum allowable channel velocity at the maximum flow rate and the floors 33 should have a slope upwardly in the direction of flow from box 30. The slope of floors 33 provides each channel with a diminishing cross-section so that the velocity of the flow is maintained substantially constant throughout the channels.

Most tanks similar to tank 21 are, at present, of circular form in which case, the spacing between ports 38 would be equal as in the embodiment of the invention described above. The distance from zone 37 to effluent trough 25 of the tank 21 is, however, not uniform because of the rectangular form of the tank and the liquid in the different sectors of the tank flowing at the same velocity will have different detention times. For maximum efficiency of the tank a slightly greater flow and velocity is effected from the corners of the tank by reducing the spacing between the ports as shown in Fig. 4. By making the spacing between the ports 38 inversely proportional to the distance from effluent trough 25, the detention time of the liquid of each sector of the tank is approximately the same.

Specifications of typical tanks having single channels are given below to show the relationship of the channel and the ports which may be provided to effect uniform distribution or flow through the several ports without appreciable head losses at maximum flow rates.

| Example | 1 | 2 | 3 |
|---|---|---|---|
| Operation: | | | |
| Gal. per min | 60.0 | 1000.0 | 3000.0 |
| Cu. ft. per sec | 0.134 | 2.23 | 6.67 |
| Det. time (hours) | 1.00 | 1.00 | 1.00 |
| Channel Size: | | | |
| Width (inches) | 3.0 | 27.0 | 40.0 |
| Length at ports (ft.) | 15.0 | 98.0 | 174.0 |
| Average depth (in.) | 6.00 | 12.0 | 24.0 |
| Ports: | | | |
| Number | 17 | 33 | 58 |
| Diameter (inches) | 1.10 | 3.31 | 4.75 |
| Head Loss (inches) | 0.720 | 0.55 | 0.45 |
| Channel Flow (Max.): | | | |
| Feet per minute | 30.0 | 30.0 | 30.0 |
| Head Loss (inches) | 0.0720 | 0.055 | 0.045 |
| Energy gradient | 0.0004 | 0.00004 | 0.00002 |

The above figures describe channels having a head loss for the channel flow which is one tenth of the head loss for each port. The maximum (negative) variation in head of the last port with respect to the first port is therefore 10%.

Inasmuch as $$Q = VA = \sqrt{2gh}A$$

and $$Q_2/Q_1 = \sqrt{(9/10)h}/\sqrt{h} = \sqrt{9/10} = .9487$$

where $Q_1$ and $Q_2$ are respectively the flows delivered to the dispersion zone by the first and last ports of the channel, which are those having the greatest difference in heads.

Where the first and last ports are adjacent, as in tank 1, the actual difference in the flow delivered to the dispersion zone is further reduced because of the merging and averaging of the streams from those ports which occurs in the dispersion zone before the flow enters the clarification zone.

In large tanks as for the treatment of sewage, a principal problem is that of clogging which disrupts any distribution system having a multiplicity of orifices. Such orifices are submerged and cannot be seen and so are not subject to inspection except by emptying the tank. Ports 38 of tank 21 are spaced along the periphery thereof and are readily accessible to determine whether any clogging has occurred and for reopening any that might have become clogged. The ports are not, however, readily subject to clogging except by large objects which are generally sticks or rags which have somehow passed the screening regularly provided. Their large size and spacing is made possible by the dispersion zone in which the several large streams are effectively merged into a single flow having a cross-section extending around the tank.

The lower baffle 14 of the tank 1 and shelf 39 of tank 21 are not required where the velocity of the flow is such that the settled material is not disturbed by the incoming raw liquid.

The scum which collects at the ends of the channels 32 and 33 may be periodically removed by scraping over the beach 42 and into the box 41. The pipe 43 connected to the sump 44 in box 41 provides for withdrawal of the scum from the box (41). Pipe 43 is normally closed as by the plug 45 and is opened by removing the plug by means of the handle 46 whenever the accumulated scum is to be withdrawn from the box.

According to the present invention, the long and relatively shallow channel provides a very effective removal of the scum and floating material which is carried to a single location at the end of the channel from which it may be conveniently removed in any of several ways. The channel thus functions both as a separation and as a distribution means. Such dual operation is made possible by the limited communication of the channel with the dispersion zone through the ports.

The number and size of the ports depend upon the volume of the flow and the length of the channel or the size of the tank and should be of such number and size which will provide a sufficiently restricted flow into the dispersion zone for the uniform distribution desired.

Various modes of carrying out the invention are contemplated as being within the scope of the following claims particularly pointing out and distinctly claiming the subject matter which is regarded as the invention.

We claim:

1. In combination with a tank for the separation of suspended materials in raw liquids, effluent means for the withdrawal of the clarified liquid from within the tank and having a weir operative to maintatin a given liquid level within the tank, skirt means fixed within the tank and spaced from the side walls of the tank to define therewith a peripheral dispersion zone opening into the lower part of the tank at the periphery thereof, and a member having a series of ports and extending between the side walls of the tank and said skirt means to define therewith an upper inlet channel separate from said dispersion zone except for communication therebetween provided by said ports, means for withdrawal of the material settling to the bottom of the tank, and means for the delivery of the raw liquid to one end of said channel, said member having a slope upwardly from said one end of the channel providing a diminishing cross-section of the flow proportionate to the rate of flow in the channel toward the shallow opposite end of the channel, the ports of said member being below the liquid level of the tank whereby the head loss as to each port is substantially uniform for the uniform introduction of the raw liquid and settleable material into the dispersion zone at any given rate of flow in the channel.

2. In a tank for the gravity-separation of the settleable solids from a liquid and having central effluent means for withdrawing the clarified liquid from the center of the tank and other means for removing the solids settled on the floor of the tank, means for distributing and introducing the flow of liquid and settleable solids uniformly around the periphery of the tank comprising floor and side members connected to and supported by the wall of the tank to form therewith a channel extending around the rim of the tank and a skirt member fixed within the tank and equally spaced from the floor and from the wall of the tank to form therewith an annular chamber beneath said channel, said channel having an inlet end for receiving the raw flow and a series of ports opening from the bottom of the channel into the upper part of said chamber, said chamber having a lower opening into the tank extending around the periphery thereof, said channel having diminishing cross-section and depth referring to the direction of flow to provide the flow with a minimum and uniform velocity whereby the settleable solids are carried and distributed with the liquid through said ports into said chamber and are uniformly introduced therewith into the tank throughout the periphery thereof, said channel and ports being submerged with respect to the liquid level maintained within the tank whereby the elevation of the channel flow above said level determining the flow through the ports is independent of the depth and velocity of the channel flow.

3. In a tank for the gravity-separation of the settleable solids from a liquid and having means for removing the solids settled on the floor of the tank and a central overflow trough for withdrawing the clarified liquid from the center of the tank and disposed to maintain a given liquid level within the tank, means for distributing and introducing the flow of liquid and settleable solids uniformly around the periphery of the tank comprising floor and side members connected to and supported by the wall of the tank to form therewith a channel extending around the rim of the tank and a skirt member fixed within the tank and equally spaced from the floor and from the wall of the tank to form therewith an annular chamber beneath said channel, said channel having an inlet end for receiving the raw flow and a series of ports opening from the bottom of the channel into the upper part of said chamber, said chamber having a lower opening into the tank extending around the periphery thereof, said channel having a diminishing cross-section and depth referring to the direction of flow to provide the flow with a minimum and uniform velocity whereby the settleable solids are carried and distributed with the liquid through said ports into said chamber and are uniformly introduced therewith into the tank throughout the periphery thereof, said channel and ports being submerged with respect to the liquid level maintained within the tank whereby the elevation of the channel flow above said level affecting the distribution of the liquid through the ports is independent of the depth and velocity of the channel flow affecting the distribution of the settleable solids.

4. The invention of claim 1 wherein the means for withdrawal of the material settling to the bottom of the tank includes eduction means disposed for movement over the entire floor of the tank and the withdrawal of the material hydraulically from said floor.

5. The tank defined in claim 1 further including means for the periodic withdrawal of scum from the end of the channel opposite the inlet end thereof.

6. The invention of claim 2 wherein the means for removing the solids settled on the floor of the tank includes an eduction tube supported at the center of the tank for movement around the center and over the floor of the tank and providing the hydraulic withdrawal of the material from said floor.

7. The tank defined in claim 2 which further includes means forming a weir at the shallow end of the channel for withdrawal of the scum driven to and collecting at said end, and a box forming a sump to receive the scum from over said weir.

8. In a tank for the gravity-separation of the settleable solids from a liquid, said tank having central effluent means for withdrawing the clarified liquid from the center of the tank and eduction means disposed for movement over and adjacent to the floor of the tank for hydraulically removing the liquid and solids adjacent to the floor of the tank, means for distributing and introducing the incoming flow of liquid and settleable solids essentially uniformly around the periphery of the tank comprising floor and side members connected to and supported by the wall of the tank to form therewith a channel extending around the rim of tank and a skirt member fixed within the tank and equally spaced from the floor and from the wall of the tank to form therewith an annular chamber beneath said channel, said channel having an inlet end for receiving the incoming flow and a series of ports opening from the bottom of the channel into the upper part of said chamber, said chamber having a lower opening into the tank extending around the periphery thereof and said channel having diminishing cross-section and depth referring to the direction of flow to provide the flow with a minimum and uniform velocity whereby the settleable solids are carried and distributed with the liquid through said ports into said chamber and are introduced from the chamber into the tank to establish and maintain on the floor of the tank a layer of settled solids for withdrawal by said eduction means with a minimum of liquid and suspended or settled solids, said channel and ports being submerged with respect to the liquid level maintained within the tank whereby the elevation of the channel flow above said level determining the flow through the ports is independent of the depth and velocity of the channel flow.

References Cited in the file of this patent

UNITED STATES PATENTS

| | | |
|---|---|---|
| 2,051,149 | Nordell | Aug. 18, 1936 |
| 2,118,157 | Camp | May 24, 1938 |
| 2,340,226 | Roberts et al. | Jan. 25, 1944 |
| 2,418,950 | Montgomery | Apr. 15, 1947 |
| 2,436,749 | Galandak et al. | Feb. 24, 1948 |
| 2,714,090 | Thompson et al. | July 26, 1955 |